(12) United States Patent
Hasan et al.

(10) Patent No.: US 7,404,026 B2
(45) Date of Patent: Jul. 22, 2008

(54) MULTI MEDIA CARD WITH HIGH STORAGE CAPACITY

(75) Inventors: Qamrul Hasan, Mountain View, CA (US); Jeremy Mah, San Jose, CA (US); Stephan Rosner, Campbell, CA (US); Roger Dwain Isaac, Santa Clara, CA (US)

(73) Assignee: Spansion LLC, Sunnyvale, CA (US)

( * ) Notice: Subject to any disclaimer, the term of this patent is extended or adjusted under 35 U.S.C. 154(b) by 64 days.

(21) Appl. No.: 11/400,902

(22) Filed: Apr. 10, 2006

(65) Prior Publication Data

US 2007/0239918 A1 Oct. 11, 2007

(51) Int. Cl.
  *G06F 13/00* (2006.01)
(52) U.S. Cl. .................... 710/301; 711/115
(58) Field of Classification Search ................ 711/115, 711/103; 710/305, 301, 313
See application file for complete search history.

(56) References Cited

U.S. PATENT DOCUMENTS

| | | | | |
|---|---|---|---|---|
| 5,276,831 A | * | 1/1994 | Nakanishi et al. ............ 345/531 |
| 5,749,088 A | * | 5/1998 | Brown et al. ................. 711/115 |
| 7,103,684 B2 | * | 9/2006 | Chen et al. .................... 710/62 |
| 2004/0236909 A1 | * | 11/2004 | Shikata et al. ............... 711/115 |
| 2005/0015539 A1 | * | 1/2005 | Horii et al. ................... 711/103 |
| 2005/0185463 A1 | | 8/2005 | Kanamori et al. |
| 2005/0286284 A1 | | 12/2005 | See et al. |
| 2006/0025020 A1 | | 2/2006 | Yu et al. |

OTHER PUBLICATIONS

U.K. Patent Application No. 8404038 to Persaud et al., having Publication date of Jan. 30, 1985.

* cited by examiner

*Primary Examiner*—Glenn A Auve
(74) *Attorney, Agent, or Firm*—Monica H. Choi

(57) ABSTRACT

A multi media card includes a plurality of memory modules and an extraneous command decoder. The extraneous command decoder decodes a predetermined command for determining a selected memory module to be accessed from the plurality of memory modules, when a predetermined bit of the predetermined command is set to a predetermined logic level.

21 Claims, 9 Drawing Sheets

MULTI MEDIA CARD WITH HIGH STORAGE CAPACITY

TECHNICAL FIELD

The present invention relates generally to multi media cards, and more particularly, to an efficient mechanism for increasing storage capacity of a multi media card.

BACKGROUND OF THE INVENTION

Referring to FIG. 1, an electronic device 102 uses a multi media card (MMC) 104 that stores large amounts of audio and video data, as described at the web-site http://www.mmca.org. The electronic device 102 includes a slot 106 for holding the MMC 104. The electronic device 102 may be a cell phone, a PDA (personal digital assistant), a digital camera, etc. The MMC 104 typically has about 4 GB (giga-bytes) of memory capacity.

However, an electronic device may require higher memory capacity than 4 GB such as when the electronic device 102 runs multiple applications. FIG. 2 shows a block diagram of the electronic device 102 having a first application 108 and a second application 110 accessing relatively high amount of data. The two applications 108 and 110 reside in a host system 112 of the electronic device 102. The host system 112 also includes a CPU (central processing unit) 114 having a first MMC (multi media card) host controller 116 and a second MMC host controller 118.

Because the first and second applications 108 and 110 use higher than 4 GB of data, the electronic device 102 includes a first MMC (multi media card) 120 and a second MMC (multi media card) 122. The first MMC 120 includes a first MMC slave controller 124 that performs memory operations on a first memory module 126 having 4 GB of memory capacity. The second MMC 122 includes a second MMC slave controller 128 that performs memory operations on a second memory module 130 having 4 GB of memory capacity.

The electronic device 102 also includes first interface pins 132 for exchange of signals between the first MMC host controller 116 and the first MMC 120, and second interface pins 134 for exchange of signals between the second MMC host controller 118 and the second MMC 122.

FIG. 3 shows a block diagram of an electronic device 140 having just one application 108 that requires higher memory capacity than 4 GB. Thus, the electronic device 140 uses multiple MMC's 120 and 122. Elements having the same reference number in FIGS. 1, 2, and 3 refer to elements having similar structure and/or function.

In either case of FIGS. 2 and 3, the host controllers 116 and 118 generate 48-bit commands with 32-bits for addressing according to the current standard for generating commands for multi media cards, as specified at the web-site http://www.mmca.org. Thus, each MMC 120 or 122 has a respective memory module 126 or 130 with approximately 4 GB (i.e., $2^{32}$) of data.

However, use of the multiple MMC's 120 and 122 as in FIGS. 2 and 3 is inefficient with higher costs for forming multiple slots and the multiple interface pins 132 and 134 in the electronic device, and higher cost for the multiple MMC's 120 and 122. In addition, the electronic device using the MMC's is typically a portable device such that multiple MMC's undesirably increase the size of the portable electronic device.

Thus, an efficient mechanism is desired for increasing memory capacity of the MMC. A new command standard with commands having higher than 32-bits for addressing may be a solution. However, approval and adoption of a new command standard takes time. In addition, implementation of a new command standard may require hard-ware change in the host controllers 116 and 118 which would typically require large effort.

SUMMARY OF THE INVENTION

Accordingly, the present invention is directed to efficiently increasing memory capacity of a MMC (multi media card) using existing command standards.

A multi media card in an aspect of the present invention includes a plurality of memory modules and an extraneous command decoder. The extraneous command decoder decodes a predetermined command for determining a selected memory module to be accessed from a plurality of memory modules, when a predetermined bit of the predetermined command is set to a predetermined logic level.

In another embodiment of the present invention, the multi media card further includes a usual command decoder that decodes the predetermined command that specifies an operation to be performed on a predetermined one of the plurality of memory modules, when the predetermined bit of the predetermined command is not set to the predetermined logic level. In an example embodiment of the present invention, the operation to be performed on the predetermined one of the memory modules is a block read/write operation, and the predetermined command specifies a block length for the block read/write operation.

In another embodiment of the present invention, the usual command decoder decodes at least one subsequent command for at least one memory operation on the selected memory module.

In an example embodiment of the present invention, a hot bit of a set of bits of the predetermined command indicates the selected memory module. In another embodiment of the present invention, a bit pattern of a set of bits of the predetermined command indicates the selected memory module.

In this manner, an existing command is used for indicating the selected memory module such that multiple memory modules may be formed and accessed on a multi media card. The existing command is used for dual purposes of specifying a usual command for a predetermined memory module (thus providing backward compatibility with earlier MMC models) or of specifying a selected memory module of multiple memory modules on the multi media card (thus allowing increased memory capacity). Such a mechanism of the present invention is implemented efficiently with soft-ware change in the host system of the electronic device and hard-ware change in a slave controller of the multi media card.

BRIEF DESCRIPTION OF THE DRAWINGS

These and other features and advantages of the present invention will be better understood by considering the following detailed description of the invention, which is presented with the attached drawings in which:

FIG. 2 shows a block diagram of an electronic device using multiple multi media cards for running multiple applications, according to the prior at;

The figures referred to herein are drawn for clarity of illustration and are not necessarily drawn to scale. Elements having the same reference number in FIGS. 1, 2, 3, 4, 5, 6, 7, 8, 9, 10, 11, and 12 refer to elements having similar structure and/or function.

DETAILED DESCRIPTION

Figure 1:
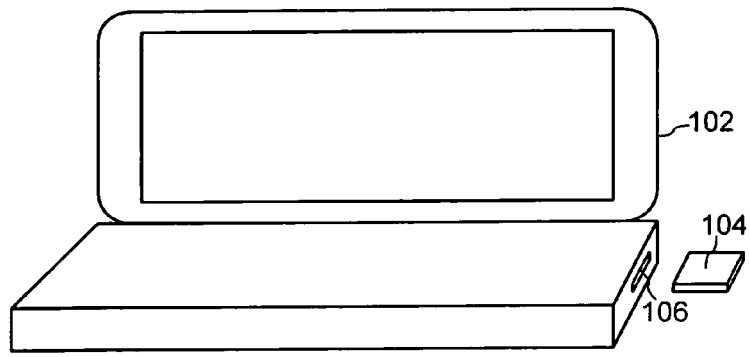
FIG. 1 shows an electronic device using a multi media card as known in the prior art.
Figure 2:
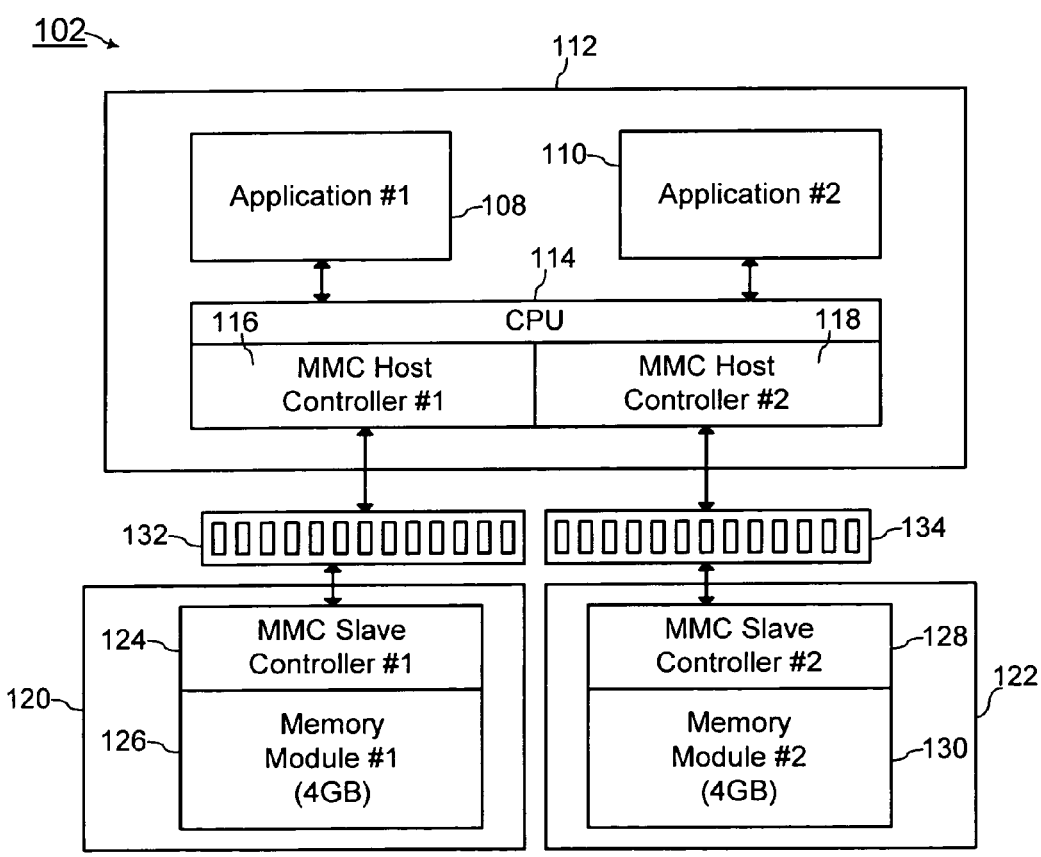
Figure 3:
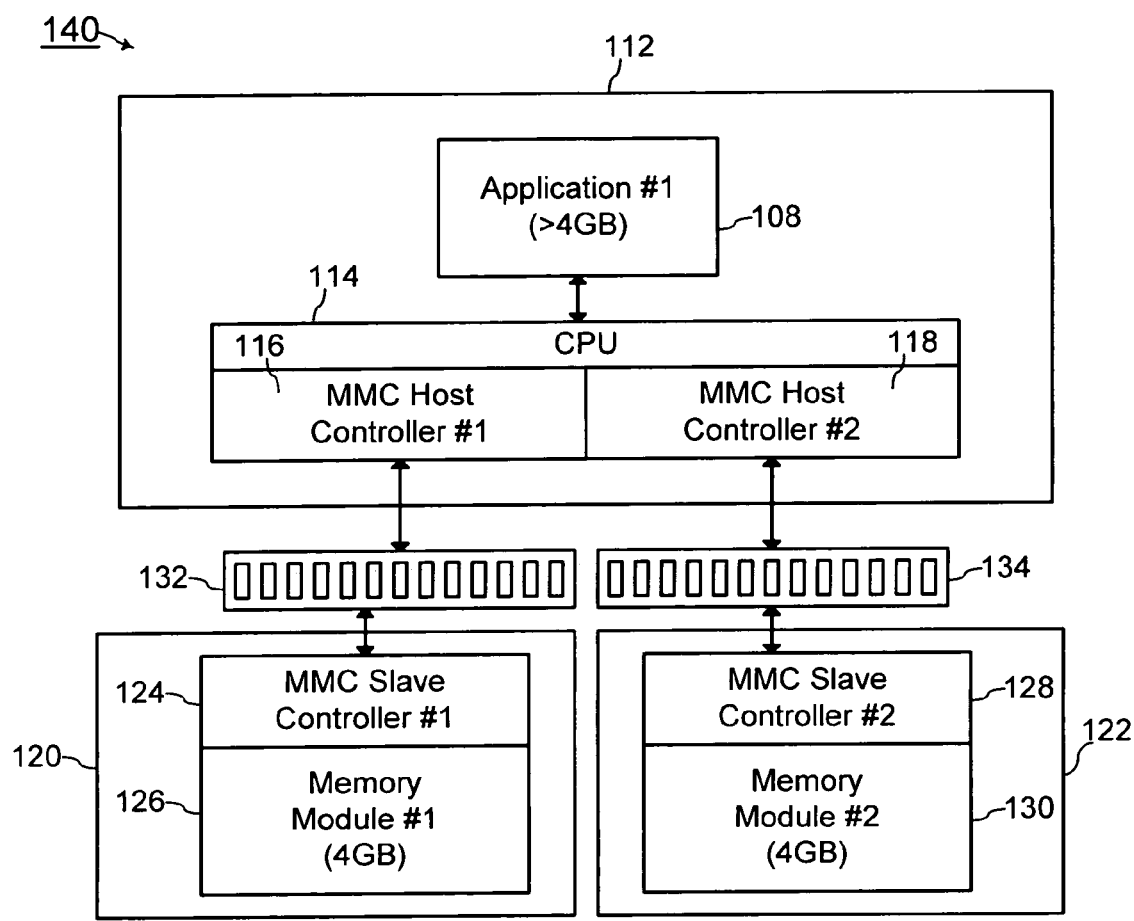
FIG. 3 shows a block diagram of an electronic device using multiple multi media cards for running an application requiring high amount of data, according to the prior art.
Figure 4:
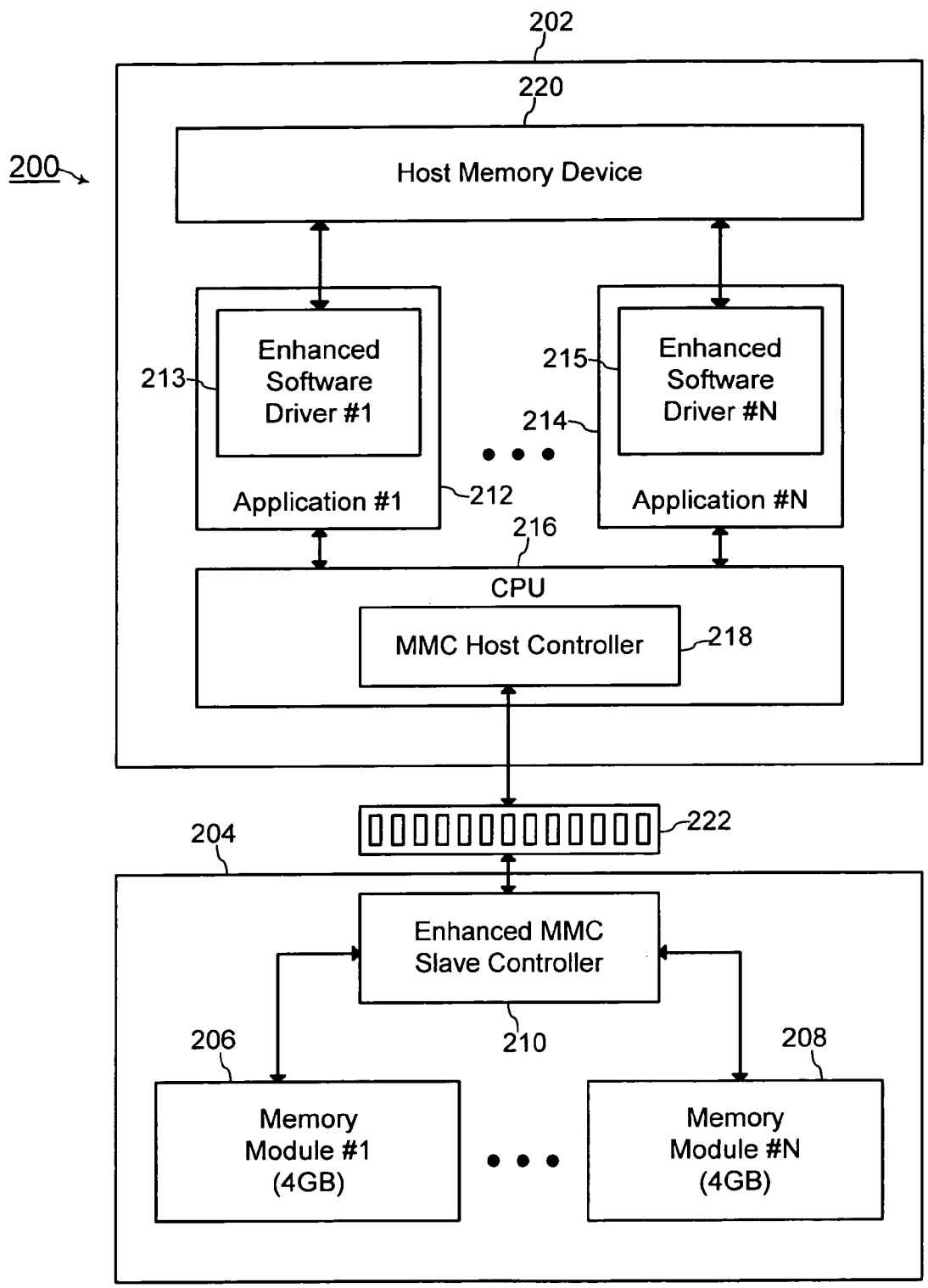
FIG. 4 shows a block diagram of an electronic device using a single multi media card having higher data capacity for running multiple applications, according to an embodiment of the present invention.

FIG. 4 shows a block diagram of an electronic device 200 having a host system 202 and a multi media card 204, according to an embodiment of the present invention. The electronic device 200 may be a cell phone, a PDA (personal digital assistant), a digital camera, or any other type of electronic device using a multi media card.

The multi media card (MMC) 204 has increased memory capacity with multiple memory modules 206 through 208. Generally, the multi media card 204 has N memory modules, each having memory capacity of about 4 GB for example. The multimedia card also includes an enhanced MMC slave controller 210 for accessing the multiple memory modules 206 through 208.

The host system 202 runs multiple applications 212 through 214 using data stored in the memory modules 206 through 208. Each of the applications 212 through 214 has a respective enhanced software driver 213 through 215. The host system 202 also includes a host CPU (central processing unit, i.e., a data processor) 216 with a MMC host controller 218. The host system 202 further includes a host memory device 220 with sequences of instructions stored thereon. Execution of such sequences of instructions by any of the enhanced software drivers 213 through 215 causes such a software driver to perform the steps of the flow-charts of FIGS. 7 and 8.

The electronic device 200 further includes interface pins 222 for exchange of signals between the MMC host controller 218 of the host system 202 and the MMC slave controller 210 of the MMC 204. Thirteen pins 222 are used according to the current physical standards for implementing an MMC, as specified at the web-site http://www.mmca.org.

Figure 5:
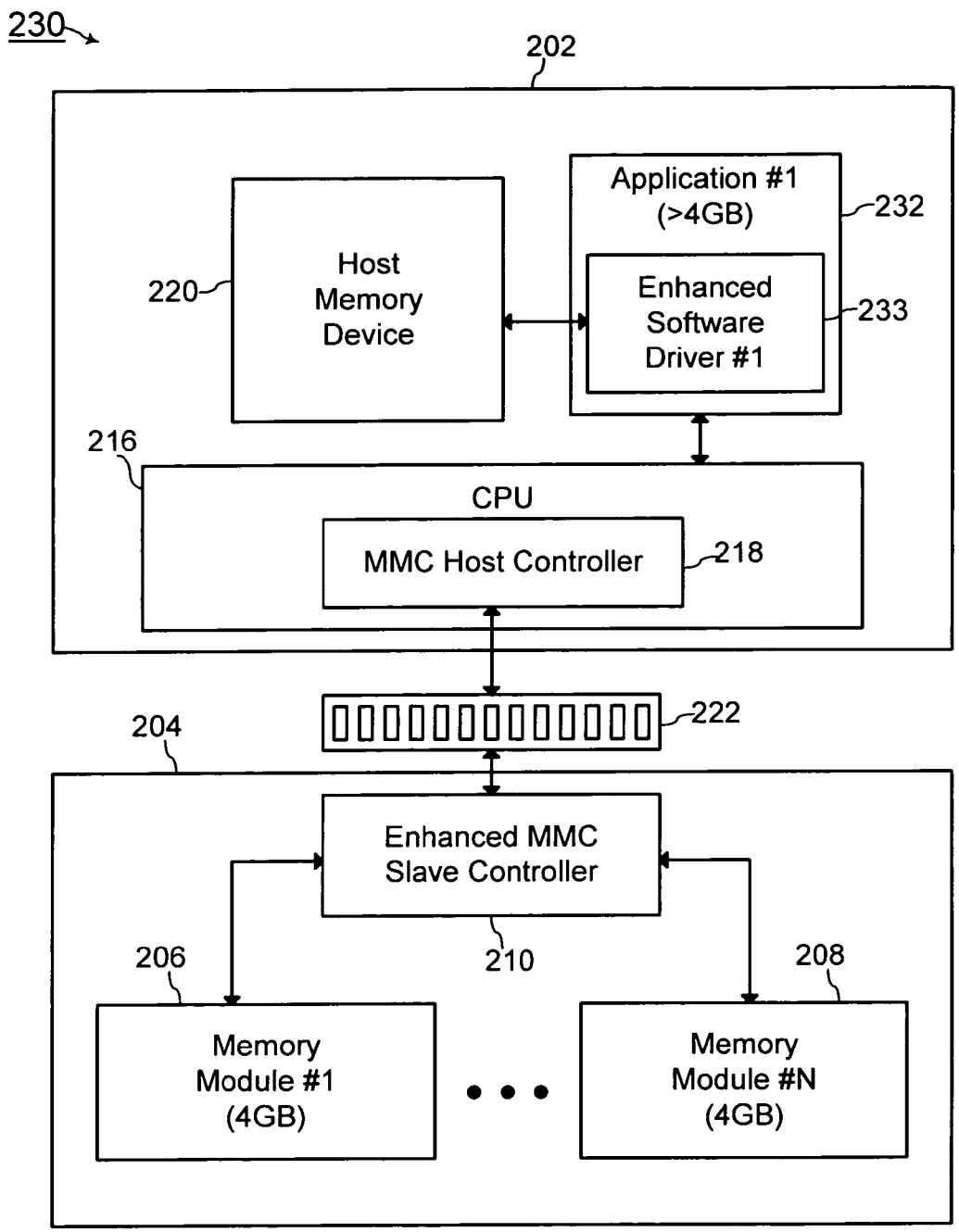
FIG. 5 shows a block diagram of an electronic device using a single multi media card having higher data capacity for running a single application requiring high amount of data, according to an embodiment of the present invention.

FIG. 5 shows a block diagram of an electronic device 230 according to another embodiment of the present invention. The electronic device 230 of FIG. 5 is similar to the electronic device 200 of FIG. 4, and elements having the same reference number in FIGS. 4 and 5 refer to elements having similar structure and/or function. However, the host system 202 in FIG. 5 runs a single application 232 requiring a relatively large amount of data from the multiple memory modules 206 through 208. The single application 232 has an enhanced software driver 233, and execution of sequences of instructions stored in the memory device 220 by the enhanced software drivers 233 causes the software driver 233 to perform the steps of the flow-charts of FIGS. 7 and 8.

Figure 6:
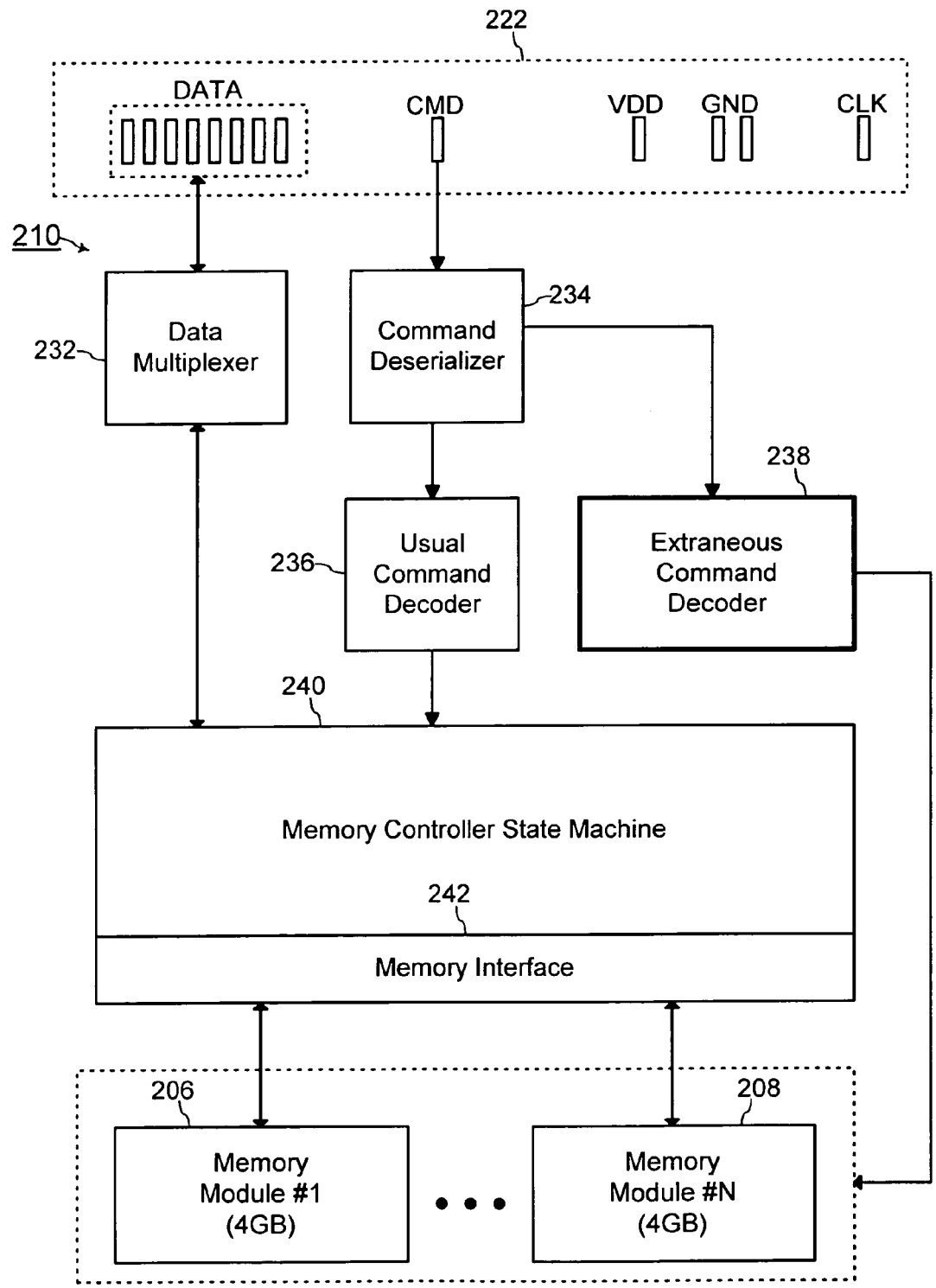
FIG. 6 shows a block diagram of an enhanced multi media card slave controller in FIG. 4 or 5, according to an embodiment of the present invention.

FIG. 6 shows a block diagram of the enhanced MMC slave controller 210 of FIG. 4 or 5, according to an embodiment of the present invention. The slave controller 210 includes a data multiplexer 232 coupled between eight pins DATA of the interface pins 222. The slave controller 210 also includes a command deserializer 234 coupled to a command pin CMD of the interface pins 222.

The command deserializer 234 is coupled to a usual command decoder 236 and an extraneous command decoder 238. The usual command decoder 236 is coupled to a memory controller state machine 240 that accesses the plurality of memory modules 206 through 208 via a memory interface 242.

The data multiplexer 232 exchanges data between the data pins DATA and the memory controller state machine 240. The command deserializer 234 receives serially the total number of bits (such as 48 bits for example) of a command from the host controller 218 via the command pin CMD. The command deserializer 234 then deserializes such a command to provide the bits of the command to the usual command decoder 236 and the extraneous command decoder 238.

The usual command decoder 236 decodes such a command to control the memory controller state machine for performing a memory operation on any of the memory modules 206 through 208. The extraneous command decoder 238 decodes a predetermined command to indicate which of the memory modules 206 through 208 is selected (i.e., a selected memory module SMM) for access.

Figure 9:
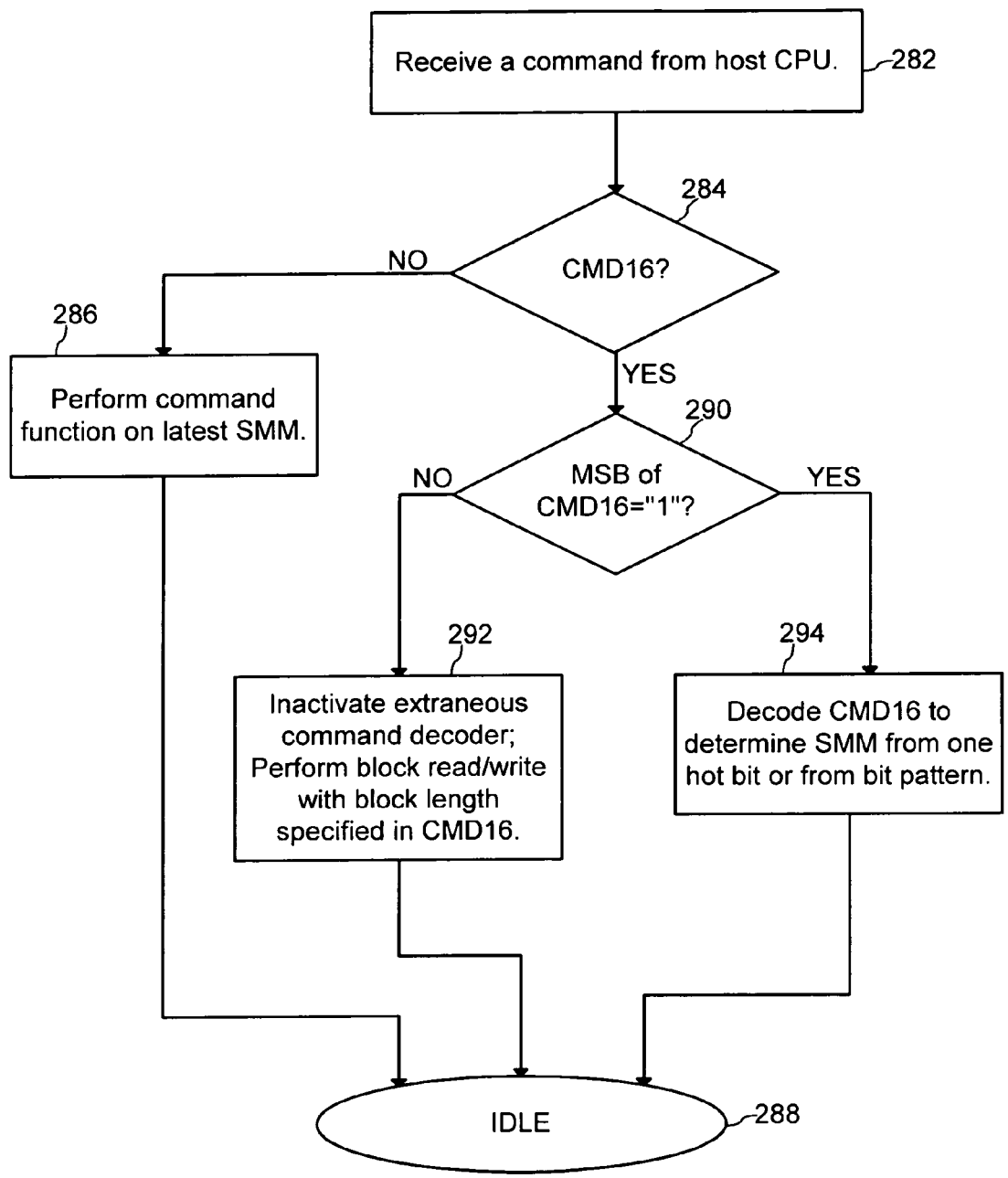
FIG. 9 shows a flow-chart of steps performed by the enhanced multi media card slave controller of FIG. 6, according to an embodiment of the present invention.

The components 232, 234, 236, 240, and 242 of the slave controller 210 are individually known to one of ordinary skill in the art of multi media cards. The slave controller 210 is enhanced by including the extraneous command decoder 238 according to an embodiment of the present invention. FIG. 9 shows a flow-chart of steps performed by the extraneous command decoder 238 according to an embodiment of the present invention.

Figure 7:
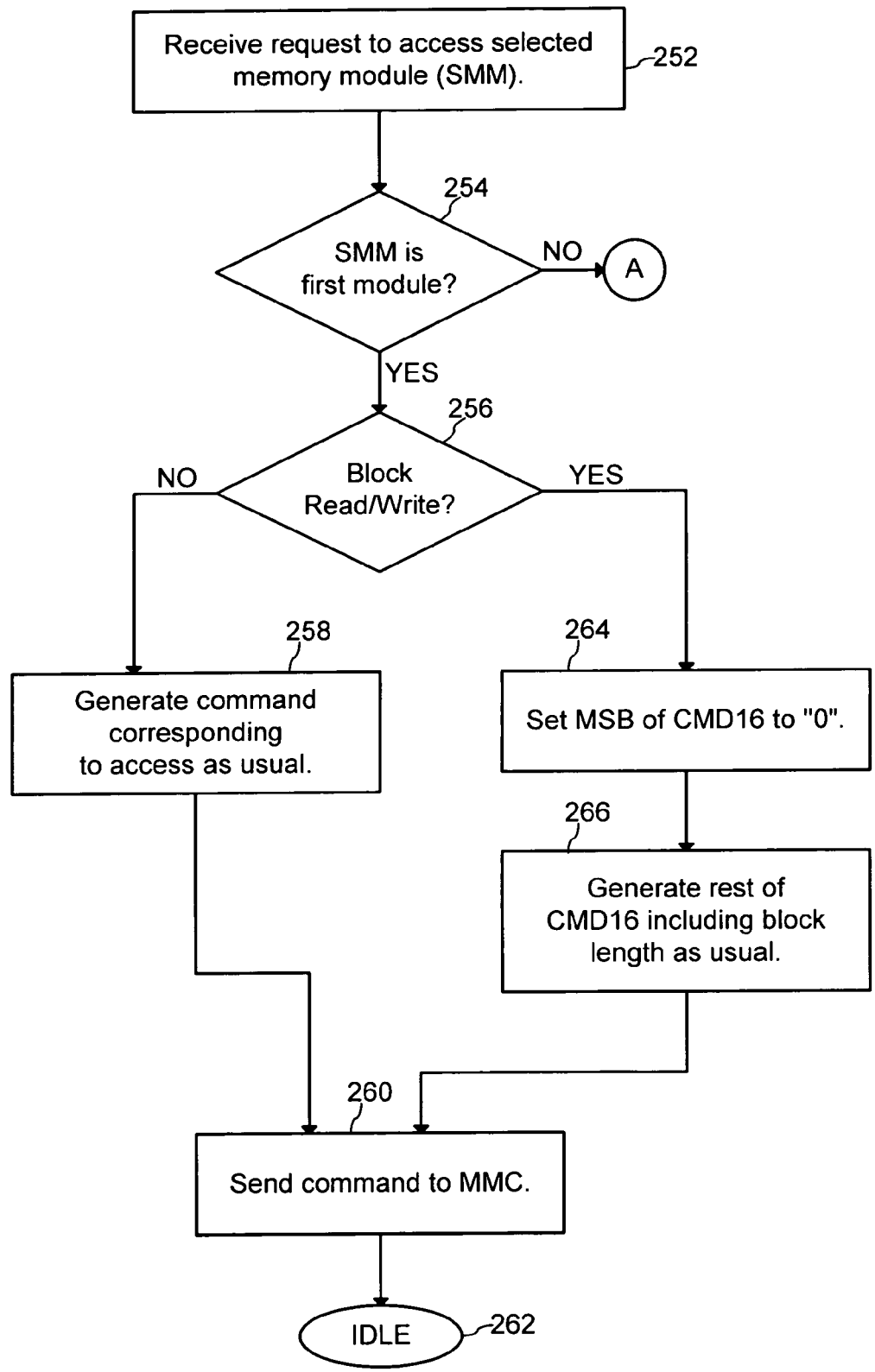
FIGS. 7 and 8 show flow-charts of steps performed by an enhanced software driver in FIG. 4 or 5, according to an embodiment of the present invention.
Figure 8:
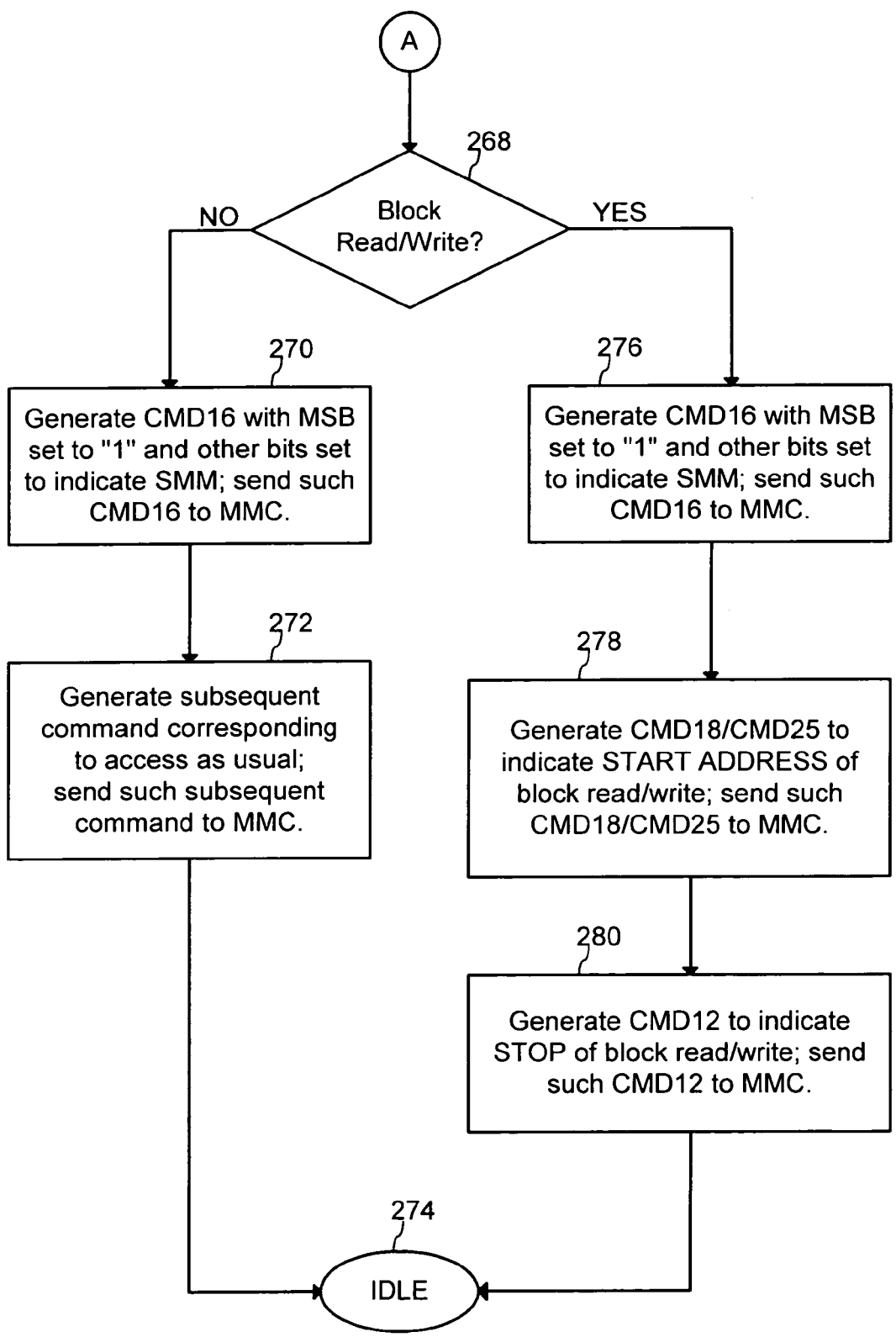

Operation of the multi media card 200 of FIG. 4 or 230 of FIG. 5 is now described in reference to the flow-charts of FIGS. 7, 8, and 9. Referring to FIGS. 4, 5, and 7, one of the enhanced software drivers 213 through 215 (or 233) receives a request to access a selected memory module (SMM) of the multiple memory modules 206 through 208 (step 252 of FIG. 7) from a respective one of the applications 212 through 214 (or 232). Such an enhanced software driver then determines whether the SMM is a predetermined one of the memory modules 206 through 208 (step 254 of FIG. 7). For example, the enhanced software driver determines whether the SMM is the first memory module 206. Such a feature allows for backward compatibility with prior models of multi media cards that use just one memory module 206.

If the SMM is the first memory module 206, the enhanced software driver then determines whether the command is for a block read/write (step 256 of FIG. 7). Each command has an identifier for that command. For example, six-bits of the 48-bits total for a command may be used for such identification for a possibility of 64 different commands. In the current standard for commands as specified at the web-site http://www.mmca.org, the command for indicating a block length for a block read/write operation is identified as command 16 (CMD16).

If the command is not for CMD16, the enhanced software driver generates the 48-bits of the command (step 258 of FIG. 7) which includes a set of bits for identifying that particular type of command. In addition, another set of bits (such as 32-bits) within the 48-bits total for that command indicates the address in the first memory module 206 that is being accessed for an operation corresponding to the command. The 48-bits of such a command are sent to the slave controller 210 of the multi media card via the MMC host controller 218 and the command pin CMD (step 260 of FIG. 7). The enhanced software driver then enters an idle state 262 until another command is received from one of the applications 212 through 214 (or 232).

Referring back to step 256 of FIG. 7, if the command is CMD16, then the enhanced software driver generates such a command by setting the MSB (most significant bit) of the 32-bits assigned for addressing to a logic low level "0" (step 264 of FIG. 7) to indicate that the first memory module 206 is to be accessed. In addition, the enhanced software driver generates the rest of the 48-bits total of CMD16 including the 6-bits command identifier. Furthermore, the enhanced software driver sets the rest of the 32-bits (aside from the MSB) for addressing to indicate the block length for the block read/write operation (step 266 of FIG. 7).

After step 266 in FIG. 7, the 48-bits total of such CMD16 are then sent to the slave controller 210 of the multi media card via the MMC host controller 218 and the command pin CMD (step 260 of FIG. 7). The enhanced software driver then enters an idle state 262 until another command is received from one of the applications 212 through 214 (or 232).

Referring back to step 254 of FIG. 7, if the SMM is not the first module, the enhanced software driver determines whether the command is for a block read/write (step 268 of FIG. 8). If the command is not for a block read/write, the enhanced software driver first generates a CMD16 with the MSB (most significant bit) of the 32-bits for addressing set to a logic high level "1" (step 270 of FIG. 8).

In addition, the rest of the 32-bits (aside from the MSB) for addressing are used by the enhanced software driver to indicate the selected memory module (step 270 of FIG. 8). For example, one of the remaining 31-bits for addressing is set as a hot bit to the logic high level (with the rest of the remaining 31-bits being set to the logic low level) to indicate which one of the memory modules is the selected memory module. Such an example allows for a total of 32 memory modules to be used in the multi media card 204.

Alternatively, the enhanced software driver sets a bit pattern of the remaining 31-bits used for addressing in CMD16 to indicate the selected memory module. In that case, a total of $2^{31}$ additional memory modules aside from the first memory module 206 may be used on the multi media card 204. In either case, such a generated CMD16 is then sent to the multi media card 204 (step 270 of FIG. 8).

In addition, the enhanced software driver generates at least one subsequent command to indicate a memory function to be performed on the selected memory module (step 272 of FIG. 8) corresponding to the request for access in step 252. Such a subsequent command is sent to the multi media card 204 (step 272 of FIG. 8). Once the selected memory module is indicated in step 270, the subsequent command in step 272 is generated as usual. The enhanced software driver then enters an idle state 274 in FIG. 8 until another command is received from one of the applications 212 through 214 (or 232).

Referring back to step 268 of FIG. 8, if the current command is for a block read/write and the selected memory module is not for the first memory module 206, the enhanced software driver first generates a CMD16 (step 276 of FIG. 8) similarly to step 270. Thus, the MSB (most significant bit) of the 32-bits for addressing in CMD16 is set to a logic high level "1" (step 276 of FIG. 8), and the rest of the 32-bits (aside from the MSB) for addressing indicate the selected memory module (step 276 of FIG. 8). Such a CMD16 is sent to the multi media card 204 (step 276 of FIG. 8).

After the selected memory module has been indicated with the CMD16, the enhanced software driver then generates several subsequent commands for performing the block read/write for the selected memory module. A CMD18/CMD25 is generated by the enhanced software driver and sent to the multi media card 204 to indicate a start address in the selected memory module for the block read/write operation (step 278 of FIG. 8).

Then, the multi media card 204 begins the block read/write operation from such a start address of the selected memory module. When the enhanced software driver receives the desired amount of data, the enhanced software driver generates and sends to the multi media card 204 a CMD12 command to indicate a STOP to the block read/write operation (step 280 of FIG. 8). The enhanced software driver then enters an idle state 274 in FIG. 8 until another command is received from one of the applications 212 through 214 (or 232).

FIG. 9 shows a flow-chart of steps performed by the MMC slave controller 210, according to an embodiment of the present invention. The slave controller 210 receives a command from the host controller 218 via the CMD pin (step 282 of FIG. 9). The command deserializer 234 receives the total 48-bits of a command serially and deserializes such bits to provide the 48-bits of the command to the command decoders 236 and 238.

The command decoders 236 and 238 determine whether the command is for CMD16 (step 284 of FIG. 9). If the command is not for CMD16, the usual command decoder 236 decodes the command and controls the memory controller state machine 240 to perform the memory operation specified by the command on the latest selected memory module (step 286 of FIG. 9). The slave controller 210 then enters the idle state 288 in FIG. 9 until another command is received in step 282.

Referring back to step 284, if the command is for CMD16, the command decoders 236 and 238 determine whether the MSB (most significant bit) of the 32-bits for addressing in the command is set to the predetermined high logic level "1" (step 290 of FIG. 9). If such a MSB is not set to "1", the extraneous command decoder 238 is inactivated, and the usual command decoder 236 decodes the CMD16 to perform the usual block read/write on the first memory module 206 (step 292 of FIG. 9). The slave controller 210 then enters the idle state 288 in FIG. 9 until another command is received in step 282.

On the other hand, if such a MSB is set to "1", the extraneous command decoder 238 decodes the rest of the 32-bits for addressing in CMD16 to determine the selected memory module on the multi media card 204 aside from the first memory module 206 (step 294 of FIG. 9). The extraneous command decoder 238 may determine the selected memory module from one hot bit that is set to the logic high level "1" in the remaining 31-bits for addressing aside from the MSB.

Alternatively, the extraneous command decoder 238 may determine the selected memory module from the bit pattern of the remaining 31-bits for addressing aside from the MSB.

The extraneous command decoder 238 upon determining the selected memory module may control the memory modules such that only the selected memory module is enabled for access. The slave controller 210 then enters the idle state 288 in FIG. 9 until another command is received in step 282.

Figure 10:
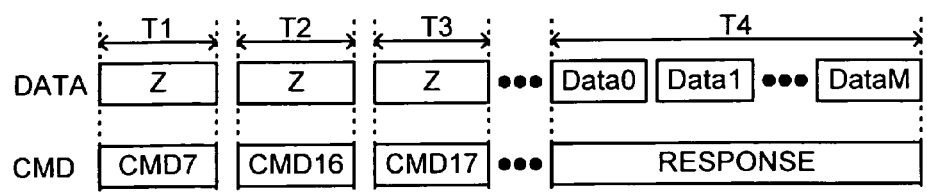
FIG. 10 shows a timing diagram of signals for a block read/write operation in a predetermined one of the memory modules in the multi media card of FIG. 4 or 5, according to an embodiment of the present invention.
Figure 11:
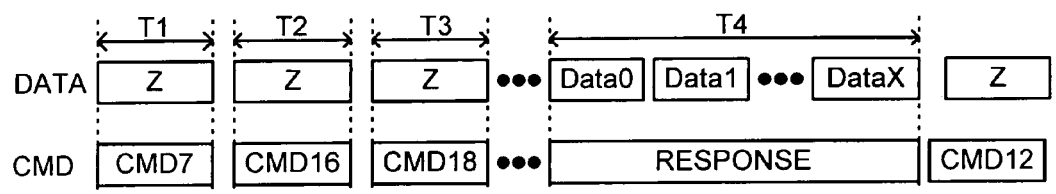
FIG. 11 shows a timing diagram of signals for a block read/write operation in a selected memory module aside from the predetermined one of FIG. 10, in the multi media card of FIG. 4 or 5 according to an embodiment of the present invention.
Figure 12:
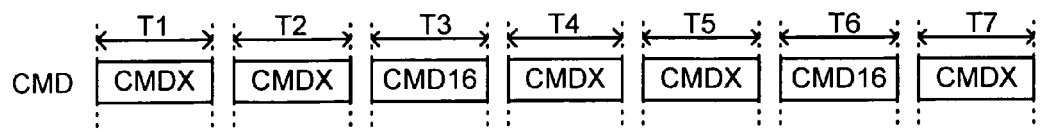
FIG. 12 shows a timing diagram of command signals for illustrating switching between different selected memory modules, according to an embodiment of the present invention.

FIGS. 10, 11, and 12 show timing diagrams of signals during example operations of the components of FIG. 4 or 5. FIG. 10 shows the timing diagram of signals when the first memory module 206 is accessed for a block read operation. In that case, command CMD7 is generated and sent by an enhanced software driver 213, 215, or 233 to the slave controller 210 to indicate selection of the multi media card 204 (during time T1 in FIG. 10). Then, command CMD16 is generated and sent by the enhanced software driver to the slave controller 210 with the MSB of the 32-bits for addressing set to the logic low level "0" (during time period T2 in FIG. 10). The remaining 31-bits for addressing may be used for indicating the block length during the block read.

Thereafter in FIG. 10, command CMD17 is generated and sent by the enhanced software driver to the slave controller 210 to indicate a starting address for the block read (during time period T3 in FIG. 10). Subsequently, the slave controller transfers data from such a starting address in the first memory module 206 to the end of the block length as specified in the previous CMD 16 (as designed by "RESPONSE" during time period T4 in FIG. 10). The block write operation in the first memory module 206 is similar to the block read operation but with CMD17 in FIG. 10 being replaced with CMD24 in FIG. 10. The operation as illustrated in FIG. 10 ensures backward compatibility with older models of multi media cards using just one memory module 206.

FIG. 11 illustrates a block read operation when the selected memory module is not the first memory module 206. Command CMD7 is generated and sent by the enhanced software driver to the slave controller 210 to indicate selection of the multi media card 204 (during time T1 in FIG. 11). Then, command CMD16 is generated and sent by the enhanced software driver to the slave controller 210 with the MSB of the 32-bits for addressing set to the logic high level "1" (during time period T2 in FIG. 11). The remaining 31-bits for addressing are used for indicating the selected memory module which is not the first memory module 206.

Thereafter in FIG. 11, command CMD18 is generated and sent by the enhanced software driver to the slave controller 210 to indicate a starting address for the read from multiple blocks (during time period T3 in FIG. 11). The slave controller 210 responds by starting to read for a default amount of block lengths from such a starting address (during time period T4 in FIG. 11).

Once the enhanced software driver receives a desired number of data blocks, command CMD12 is generated and sent by the enhanced software driver to the slave controller 210 to indicate a STOP to the block read (after time period T4 in FIG. 11). The block write operation in the selected memory module is similar to the block read operation but with CMD18 in FIG. 11 being replaced with CMD25 in FIG. 11.

FIG. 12 indicates switching among different selected memory modules. Every time another selected memory module is desired, command CMD16 is generate and sent by the enhanced software driver to the slave controller 210 (such as during time periods T3 and T6 in FIG. 12). For selecting different memory modules aside from the first memory module 206, the MSB of 32-bits for addressing in CMD16 is set to the logical high level "1". Then, the remaining 31-bits are used for indicating the selected memory module. Any subsequent commands (such as during time periods T4, T5, and T7 in FIG. 12) after each CMD16 in FIG. 12 indicates typical memory operations to be performed to that corresponding selected memory module as indicated by the just prior CMD16.

In this manner, an existing command (CMD16 for example) is used for indicating the selected memory module such that multiple memory modules may be formed and accessed on the multi media card 204. The existing command is used for dual purposes of specifying a usual command for the first memory module 206 (thus providing backward compatibility with earlier MMC models) or of specifying a selected memory module of additional memory modules on the multi media card 204 (thus allowing increased memory capacity). Such a mechanism of increasing memory capacity in the present invention efficiently requires soft-ware change in the host system 202 and hard-ware change in the slave controller 210 of the multi media card 204.

The MSB (most significant bit) of the 32-bits used in CMD16 for indicating block length is used in the present invention for indicating whether or not CMD16 is being used for specifying the selected memory module. Such a MSB may be used for this purpose because the usual block length is smaller than can be specified with the full 32-bits. Typically, less than 32-bits are sufficient to specify a maximum possible block length in a read/write operation. The present invention may also be implemented with another predetermined command (aside from the example CMD16) having a bit that would not be used for the usual command operation.

The foregoing is by way of example only and is not intended to be limiting. For example, commands or number of elements shown or described herein are by way of example only. Commands such as CMD7, CMD12, CMD16, CMD17, CMD18, CMD24, and CMD25 are individually described as used in the prior art at the web-site http://www.mmca.org. In addition, the term "memory module" means any discrete amount of memory. Thus, the memory modules 206 through 208 may each be formed on a separate IC (integrated circuit) die or may each be a memory segment formed on a same IC die.

The present invention is limited only as defined in the following claims and equivalents thereof.

We claim:

1. A multi media card, comprising:
   a plurality of memory modules;
   an extraneous command decoder that decodes a predetermined command as indicated by a predetermined command identifier bit pattern, for determining a newly selected memory module to be accessed from the plurality of memory modules when a predetermined bit of the predetermined command is set to a predetermined logic level; and
   a usual command decoder that decodes the predetermined command for determining an operation to be performed on a predetermined one of the plurality of memory modules when the predetermined bit of the predetermined command is not set to the predetermined logic level;
   wherein the predetermined memory module is different from any newly selected memory module.

2. The multi media card of claim 1, wherein the usual command decoder decodes any command that is not the predetermined command for performing a corresponding operation on a latest selected memory module.

3. The multi media card of claim 1, wherein the operation to be performed on the predetermined memory module is a block read/write operation, and wherein the predetermined command specifies a block length for the block read/write operation.

4. The multi media card of claim 1, wherein the extraneous command decoder is inactivated when the predetermined bit of the predetermined command is not set to the predetermined logic level.

5. The multi media card of claim 1, wherein the usual command decoder decodes at least one subsequent command for at least one memory operation on the newly selected memory module.

6. The multi media card of claim 1, wherein a selected bit that is set to a first logic level with a remainder of a set of bits of the predetermined command being set to a second logic level indicates the newly selected memory module.

7. The multi media card of claim 1, wherein a bit pattern of a set of bits of the predetermined command indicates the newly selected memory module.

8. An electronic device, comprising:
  a multi media card including:
    a plurality of memory modules;
    an extraneous command decoder that decodes a predetermined command as indicated by a predetermined command identifier bit pattern, for determining a newly selected memory module to be accessed from the plurality of memory modules when a predetermined bit of the predetermined command is set to a predetermined logic level; and
    a usual command decoder that decodes the predetermined command for determining an operation to be performed on a predetermined one of the plurality of memory modules when the predetermined bit of the predetermined command is not set to the predetermined logic level;
    wherein the predetermined memory module is different from any newly selected memory module; and
  a host system including:
    a processor; and
    a memory device having sequences of instructions stored thereon, wherein execution of the sequences of instructions by the processor causes the processor to perform the step of:
      setting the predetermined bit of the predetermined command to the predetermined logic level for indicating access to the newly selected memory module.

9. The electronic device of claim 8, wherein the usual command decoder decodes any command that is not the predetermined command for performing a corresponding operation on a latest selected memory module.

10. The electronic device of claim 8, wherein the operation to be performed on the predetermined memory module is a block read/write operation, and wherein the predetermined command specifies a block length for the block read/write operation.

11. The electronic device of claim 8, wherein the processor further performs the step of setting the predetermined bit of the predetermined command to another logic level different from the predetermined logic level for indicating access to the predetermined memory module.

12. The electronic device of claim 8, wherein the extraneous command decoder is inactivated when the predetermined bit of the predetermined command is not set to the predetermined logic level.

13. The electronic device of claim 8, wherein the processor further performs the step of generating at least one subsequent command to be decoded by the usual command decoder for at least one memory operation of the newly selected memory module.

14. The electronic device of claim 13, wherein the processor further performs the steps of:
  issuing a first subsequent command to the multi media card for indicating a block read/write operation for the newly selected memory module; and
  issuing a second subsequent command to the multi media card for indicating a stop to the block read/write operation after a desired amount of data has been read/written from/to the newly selected memory module.

15. The electronic device of claim 8, wherein the processor further performs the step of setting a selected bit that is set to a first logic level with a remainder of a set of bits of the predetermined command being set to a second logic level to indicate the newly selected memory module.

16. The electronic device of claim 8, wherein the processor further performs the step of setting a bit pattern of a set of bits of the predetermined command to indicate the newly selected memory module.

17. A method of accessing a plurality of memory modules in an electronic device, comprising:
  setting at a host system of the electronic device, a predetermined bit of a predetermined command to a predetermined logic level for indicating access to a newly selected memory module of a plurality of memory modules of a multi media card, the predetermined command being indicated by a predetermined command identifier bit pattern;
  decoding at the multi media card, the predetermined command for determining the newly selected memory module to be accessed when the predetermined bit of the predetermined command is set to the predetermined logic level; and
  decoding within the multi media card, the predetermined command that specifies an operation to be performed on a predetermined one of the plurality of memory modules when the predetermined bit of the predetermined command is not set to the predetermined logic level;
  wherein the predetermined memory module is different from any newly selected memory module.

18. The method of claim 17, further comprising:
  decoding within the multi media card, any command that is not the predetermined command for performing a corresponding operation on a latest selected memory module.

19. The method of claim 17, wherein the operation to be performed on the predetermined memory module is a block read/write operation, and wherein the predetermined command specifies a block length for the block read/write operation.

20. The method of claim 17, further comprising:
  setting a selected bit to a first logic level with a remainder of a set of bits of the predetermined command being set to a second logic level to indicate the newly selected memory module.

21. The method of claim 17, further comprising:
  setting a bit pattern of a set of bits of the predetermined command to indicate the newly selected memory module.

* * * * *